(12) United States Patent
Deer et al.

(10) Patent No.: US 7,656,554 B2
(45) Date of Patent: Feb. 2, 2010

(54) METHOD OF CORRECTING NEUTRAL COLOR SHIFTS CAUSED BY CARTRIDGE VARIATIONS

(75) Inventors: Anna Yaping Deer, Lexington, KY (US); Xuan-Chao Huang, Lexington, KY (US); Brant Dennis Nystrom, Lexington, KY (US); Richard Lee Reel, Georgetown, KY (US)

(73) Assignee: Lexmark International, Inc., Lexington, KY (US)

( * ) Notice: Subject to any disclaimer, the term of this patent is extended or adjusted under 35 U.S.C. 154(b) by 766 days.

(21) Appl. No.: 10/877,577

(22) Filed: Jun. 25, 2004

(65) Prior Publication Data

US 2005/0285891 A1 Dec. 29, 2005

(51) Int. Cl.
- G03F 3/00 (2006.01)
- B41J 2/01 (2006.01)
- B41J 29/393 (2006.01)
- B41J 2/175 (2006.01)

(52) U.S. Cl. .......... 358/1.9; 358/501; 358/504; 358/518; 358/523; 358/525; 347/19; 347/86; 345/591; 345/601; 345/602; 345/603; 345/604; 382/167

(58) Field of Classification Search ............... 358/501, 358/504, 1.9, 518, 523, 525; 382/167; 345/591, 345/601, 602, 603, 604; 347/19, 86
See application file for complete search history.

(56) References Cited

U.S. PATENT DOCUMENTS

| | | | |
|---|---|---|---|
| 5,053,866 A | | 10/1991 | Johnson |
| 6,008,907 A | | 12/1999 | Vigneau et al. |
| 6,019,461 A | * | 2/2000 | Yoshimura et al. ............ 347/86 |
| 6,027,201 A | * | 2/2000 | Edge ............................ 347/19 |
| 6,042,211 A | * | 3/2000 | Hudson et al. ................. 347/15 |
| 6,175,375 B1 | * | 1/2001 | Able et al. .................... 347/132 |
| 6,205,246 B1 | | 3/2001 | Usami |
| 6,320,668 B1 | | 11/2001 | Kim |
| 6,467,867 B1 | * | 10/2002 | Worthington et al. ......... 347/19 |
| 6,585,343 B2 | | 7/2003 | Bauer |
| 6,750,993 B1 | * | 6/2004 | Shirai .......................... 358/504 |
| 6,853,464 B1 | * | 2/2005 | Ueda et al. .................... 358/1.9 |
| 7,059,701 B2 | * | 6/2006 | Deer et al. .................... 347/19 |
| 2001/0033387 A1 | | 10/2001 | Nogiwa et al. |
| 2002/0149785 A1 | * | 10/2002 | Chu et al. ..................... 358/1.9 |
| 2003/0025925 A1 | * | 2/2003 | Elsman et al. ................ 358/1.9 |
| 2003/0058459 A1 | | 3/2003 | Wu et al. |
| 2003/0058460 A1 | * | 3/2003 | Denton et al. ................. 358/1.9 |
| 2003/0128378 A1 | | 7/2003 | Cooper et al. |
| 2003/0202197 A1 | | 10/2003 | Saito et al. |
| 2003/0210414 A1 | | 11/2003 | Kuno |
| 2003/0234946 A1 | | 12/2003 | Saito |
| 2004/0001210 A1 | * | 1/2004 | Chu et al. ..................... 358/1.9 |
| 2004/0070776 A1 | | 4/2004 | Yao et al. |
| 2004/0223025 A1 | * | 11/2004 | D'souza et al. ............... 347/19 |
| 2005/0073731 A1 | * | 4/2005 | Deer et al. .................... 358/518 |
| 2007/0132800 A1 | * | 6/2007 | Huang et al. .................. 347/19 |

FOREIGN PATENT DOCUMENTS

JP 2003-169219 * 6/2003

* cited by examiner

Primary Examiner—David K Moore
Assistant Examiner—Beniyam Menberu

(57) ABSTRACT

A method for correcting neutral color shift in a production cartridge for use in an imaging system includes determining a colorant increment data based on a standard cartridge neutral variation signature color data and a standard cartridge neutral sensitivity signature color data associated with a standard cartridge, and based on a production cartridge neutral variation signature color data and a production cartridge neutral sensitivity signature color data associated with the production cartridge, and using the colorant increment data to correct the neutral color shift.

28 Claims, 8 Drawing Sheets

METHOD OF CORRECTING NEUTRAL COLOR SHIFTS CAUSED BY CARTRIDGE VARIATIONS

BACKGROUND OF THE INVENTION

1. Field of the Invention

The present invention relates to an imaging apparatus, and, more particularly, to a method for correcting neutral color shift in a production cartridge for use in an imaging system.

2. Description of the Related Art

In recent years, the use of computers for home and business purposes has increased significantly. Computer systems typically incorporate a computer monitor, a scanner, and a printer. Users frequently employ such systems for scanning, modifying, and/or creating various color documents. The documents may include personal greeting cards, photographs, pamphlets, flyers, brochures, iron-on transfers to clothing, business presentations, business cards, and other personal or business related documents. Such color documents are usually reproduced on a substrate using a personal or business printer, and distributed to various recipients, such as family or friends, or individual/business consumers. It is desirable that the reproduced documents appear consistent, notwithstanding the use of different printing cartridges.

The neutral color shift from one printhead cartridge to another is a common problem in color reproduction, particularly for photo paper printing. Since the human eye is more sensitive to the changes in neutral and near-neutral colors, i.e., colors that are on or near the achromatic neutral axis in colorspace, than changes in other colors, neutral color variations from cartridge to cartridge are readily apparent, and are undesirable to customers and users of imaging equipment. However, neutral color correction is difficult to implement properly. Generally, the known methods for correcting neutral colors are not visually accurate, and are unable to adequately correct for neutral color shift.

What is needed in the art is a method for correcting neutral color shift in a production cartridge for use in an imaging system.

SUMMARY OF THE INVENTION

The present invention provides a method for correcting neutral color shift in a production cartridge for use in an imaging system.

The invention, in one form thereof, relates to a method for correcting neutral color shift in a production cartridge for use in an imaging system. The method includes determining a colorant increment data based on a standard cartridge neutral variation signature color data and a standard cartridge neutral sensitivity signature color data associated with a standard cartridge, and based on a production cartridge neutral variation signature color data and a production cartridge neutral sensitivity signature color data associated with the production cartridge; and using the colorant increment data to correct the neutral color shift.

The invention, in another form thereof, relates to an imaging apparatus. The imaging apparatus includes a print engine configured to mount a production cartridge, and a controller communicatively coupled to the print engine. The controller executes instructions to determine a colorant increment data based on a standard cartridge neutral variation signature color data and a standard cartridge neutral sensitivity signature color data associated with a standard cartridge, and based on a production cartridge neutral variation signature color data and a production cartridge neutral sensitivity signature color data associated with the production cartridge. The controller also executes instructions to use the colorant increment data to correct the neutral color shift.

An advantage of the present invention is that neutral color variation between production cartridges is reduced.

Another advantage is that the neutral color variation is reduced without regard to the number of ink variables employed in the imaging apparatus, i.e., the number of ink concentrations and/or dot sizes.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplifications set out herein illustrate an embodiment of the invention, in one form, and such exemplifications are not to be construed as limiting the scope of the invention in any manner.

DETAILED DESCRIPTION OF THE INVENTION

Figure 1:
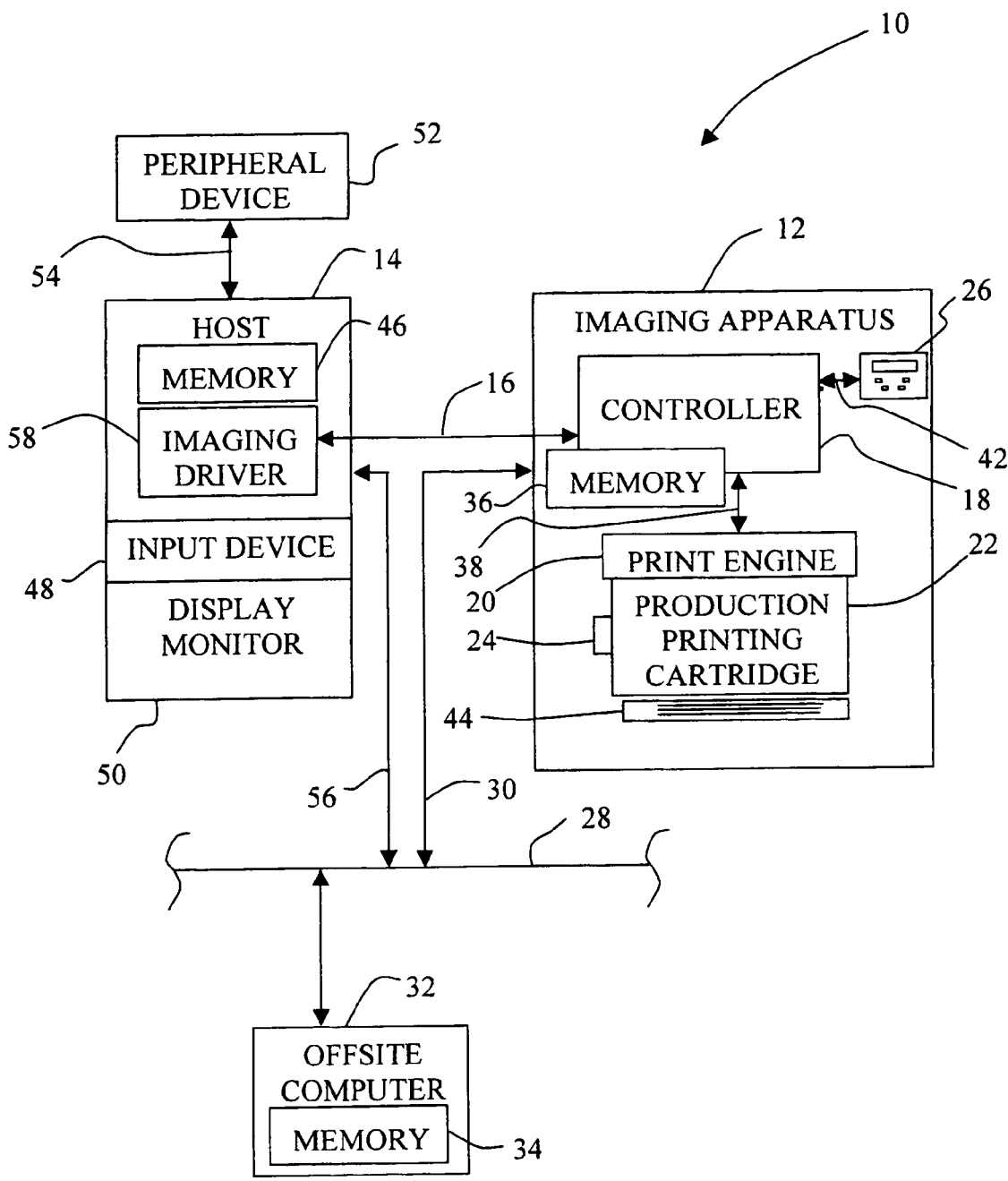
FIG. 1 is a diagrammatic depiction of an imaging system that utilizes the present invention.

Referring now to the drawings, and particularly to FIG. 1, there is shown a diagrammatic depiction of an imaging system 10 embodying the present invention. Imaging system 10 includes an imaging apparatus 12 and a host 14. Imaging apparatus 12 communicates with host 14 via a communications link 16.

Imaging apparatus 12 can be, for example, an ink jet printer and/or copier, an electrophotographic printer and/or copier, or an all-in-one (AIO) unit that includes a printer, a scanner, and possibly a fax unit. Imaging apparatus 12 includes a controller 18, a print engine 20, a printing cartridge, such as production cartridge 22 having cartridge memory 24, and a user interface 26. Controller 18 is communicatively coupled to print engine 20, and print engine 20 is configured to mount production cartridge 22. Imaging apparatus 12 has access to a network 28, such as the Internet, via a communication line 30, to interface with an offsite computer 32 having an offsite memory 34, in order to transmit and/or receive data for use in carrying out its imaging functions.

Controller 18 includes a processor unit and associated memory 36, and may be formed as one or more Application Specific Integrated Circuits (ASIC). Controller 18 may be a printer controller, a scanner controller, or may be a combined printer and scanner controller. Although controller 18 is depicted in imaging apparatus 12, alternatively, it is contemplated that all or a portion of controller 18 may reside in host 14. Controller 18 communicates with print engine 20, production cartridge 22, and cartridge memory 24 via a communications link 38, and with user interface 26 via a communications link 42. Controller 18 serves to process print data and to operate print engine 20 during printing.

In the context of the examples for imaging apparatus 12 given above, print engine 20 can be, for example, an ink jet print engine or a color electrophotographic print engine, configured for forming an image on a substrate 44, which may be one of many types of print media, such as a sheet of plain paper, fabric, photo paper, coated ink jet paper, greeting card stock, transparency stock for use with overhead projectors, iron-on transfer material for use in transferring an image to an article of clothing, and back-lit film for use in creating advertisement displays and the like. As an ink jet print engine, print engine 20 operates production cartridge 22 to eject ink droplets onto substrate 44 in order to reproduce text or images, etc. As an electrophotographic print engine, print engine 20 causes production cartridge 22 to deposit toner onto substrate 44, which is then fused to substrate 44 by a fuser (not shown).

Host 14 may be, for example, a personal computer, including memory 46, an input device 48, such as a keyboard, and a display monitor 50. A peripheral device 52, such as a digital camera, is coupled to host 14 via a communication link 54. Host 14 further includes a processor, input/output (I/O) interfaces, and is connected to network 28 via a communication line 56, and hence, has access to offsite computer 32, including offsite memory 34. Memory 46 can be any or all of RAM, ROM, NVRAM, or any available type of computer memory, and may include one or more of a mass data storage device, such as a floppy drive, a hard drive, a CD-ROM and/or a DVD unit.

During operation, host 14 includes in its memory 46 a software program including program instructions that function as an imaging driver 58, e.g., printer/scanner driver software, for imaging apparatus 12. Imaging driver 58 is in communication with controller 18 of imaging apparatus 12 via communications link 16. Imaging driver 58 facilitates communication between imaging apparatus 12 and host 14, and provides formatted print data to imaging apparatus 12, and more particularly, to print engine 20. Although imaging driver 58 is disclosed as residing in memory 46 of host 14, it is contemplated that, alternatively, all or a portion of imaging driver 58 may be located in controller 18 of imaging apparatus 12.

Figure 2:
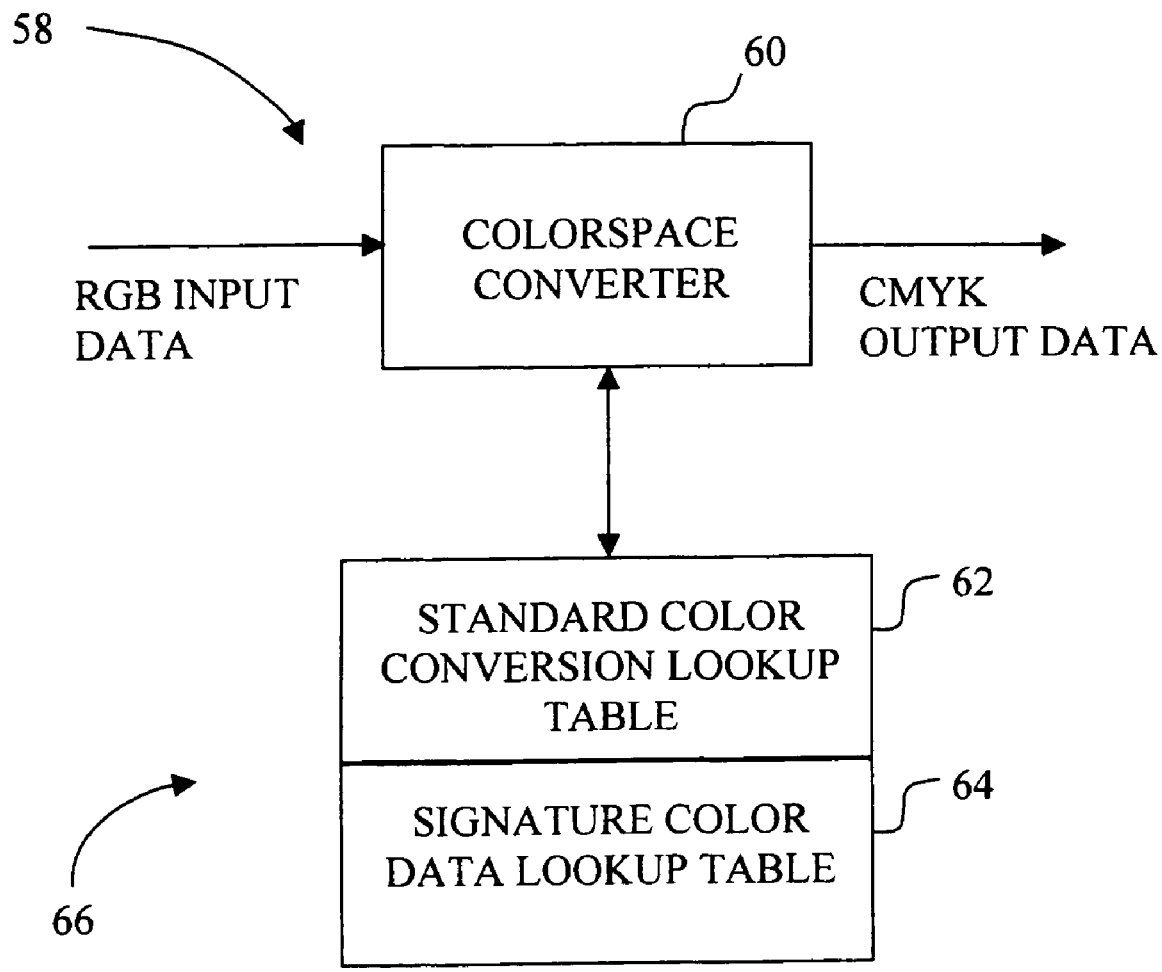
FIG. 2 is a diagrammatic depiction of a colorspace converter accessing a composite color conversion lookup table in accordance with the present invention.

Referring now to FIG. 2, imaging driver 58 includes a colorspace converter 60. Although described herein as residing in imaging driver 58, colorspace converter 60 may be in the form of firmware or software, and may reside in either imaging driver 58 or controller 18. Alternatively, some portions of colorspace converter 60 may reside in imaging driver 58, while other portions reside in controller 18.

Colorspace converter 60 is used for converting color signals from a first colorspace, such as an RGB colorspace employed by display monitor 50, to a second colorspace, for example, CMYK (cyan, magenta, yellow, and black), which is used by print engine 20. The output of colorspace converter 60 may be used to provide multilevel printing, for example, CcMmYyKcm printing, which employs the following ink drop sizes/strengths/compositions: large undiluted cyan dye-based ink drops ("C"), small undiluted cyan dye-based drops ("c"), large undiluted magenta dye-based ink drops ("M"), small undiluted magenta dye-based ink drops ("m"), large undiluted yellow dye-based ink drops ("Y"), small undiluted yellow dye-based ink drops ("y"), undiluted black pigment-based ink drops ("K"), dilute cyan pigment-based ink drops (second occurrence in "CcMmYyKcm" of "c"), and dilute magenta pigment-based ink drops (second occurrence of "m"). It will be understood that any reference to CMYK may include any combination of the CcMmYyKcm inks, and that any reference to CMY may include any combination of CcMmYy inks.

Coupled to colorspace converter 60 are a standard color conversion lookup table 62 and a signature color data lookup table 64, which together define a composite color conversion lookup table 66. Standard color conversion lookup table 62 and composite color conversion lookup table 66 are multidimensional lookup tables having at least three dimensions, and include RGB values and CMYK values, wherein each CMYK output value corresponds to an RGB input value. Standard color conversion lookup table 62 and composite color conversion lookup table 66 may also include other data, such as spectral data, or other values or parameters for use in performing color conversion or color calibration.

Standard color conversion lookup table 62 is the basic color conversion lookup table accessed by colorspace converter 60 of imaging apparatus 12 and imaging system 10 for performing color conversion. Signature color data lookup table 64 is specifically associated with the present invention method, forming an inventive component of the composite color conversion lookup table 66 used in the color conversion process. As shown in FIG. 2, for example, colorspace converter 60 converts input RBG color data for a displayed or scanned image into neutral color shift corrected CMYK output data that may be printed by print engine 20 using composite color conversion lookup table 66, hence using signature color data lookup table 64 and standard color conversion lookup table 62.

Standard color conversion lookup table 62 incorporates color conversion data to support color conversion via composite color conversion lookup table 66 for multiple color formats and the multiple types of substrate 44. Color formats supported by standard color conversion lookup table 62 and signature color data lookup table 64, hence composite color conversion lookup table 66, include, for example, monochrome K output using true black ink only, CMY color output, wherein neutral colors are formed using process black, also known as composite black, which is produced by using a combination of CMY color inks, and CMYK color printing using a combination of color inks and true black ink.

Signature color data lookup table 64 is a multidimensional lookup table having at least three dimensions that includes multidimensional color data for production cartridge 22 expressed in a device independent CIELAB colorspace form. Alternatively, signature color data lookup table 64 may be in the form of multidimensional CIEXYZ device-independent colorspace data. However, the multidimensional color data of signature color data lookup table 64 may be expressed in any convenient device-dependent or device-independent colorspace. It will be understood that signature color data lookup table 64 may also include other data, such as spectral data, or other values or parameters for use in performing color conversion or color calibration.

Signature color data lookup table 64 represents the "signature" colors of production cartridge 22, such as, for example, the individual color output characteristics of the particular production cartridge 22. The signature colors of a cartridge are a small set of colors that can be used to characterize the cartridge, or to classify the cartridge into a class of cartridges with similar color characteristics.

In the embodiment described here, the signature color data is arranged in signature color data lookup table 64 in an ordered format for access by colorspace converter 60, wherein the order of the data allows colorspace converter 60 to correlate the data of signature color data lookup table 64 with the similarly ordered data of standard color conversion lookup table 62 in defining composite color conversion lookup table 66.

Each of standard color conversion lookup table 62, signature color data lookup table 64, and composite color conversion lookup table 66 may alternatively be in the form of groups of polynomial functions capable of providing the same multidimensional output as if in the form of lookup tables.

The present invention provides a method and apparatus for correcting neutral color shift in production cartridge 22 for use in imaging apparatus 12 and imaging system 10, in order to prevent the neutral color shift in printed output that typically occurs due to variations between different production cartridges 22. Neutral colors are those colors that have no apparent chromaticity. The variations between different production cartridges 22 may include, for example, those differences resulting from manufacturing and assembly tolerances, subcomponent tolerances, the use of different manufacturers or different manufacturing lots, and/or variations in ink compositions or ink coloring agents. Thus, by virtue of the present invention, different production cartridges 22 may be employed by a user, a first time or subsequent times, while providing consistent color reproduction, without regard to changing or replacing a particular production cartridge 22 that has reached the end of its useful life or run out of ink, or reached the end of its use for a current reproduction job.

In order to perform neutral color correction, the present invention employs neutral signature color data representative of cartridge neutral signature colors. The cartridge neutral signature colors are a small set of colors that can be used to classify a cartridge into a class of cartridges with similar color characteristics in the neighborhood of neutral colors. The signature colors are defined in terms of the display monitor 50 CMY (cyan, magenta and yellow) colors rather than the imaging apparatus 12 C'M'Y' colors since the former has been well defined for neutral colors which have the characteristics of C=M=Y. The relationship between display monitor 50 CMY values and the display monitor 50 RGB (red, green, and blue) values is given by: C=255-R, M=255-G, Y=255-B. The display monitor 50 neutral colors can be reproduced with imaging apparatus 12 where the printed neutral colors normally consist of unequal C', M', and Y'.

Another advantage in using display monitor 50 CMY rather than printer C'M'Y' is that only three colorant variables need to be considered, regardless of the number of ink variables. Thus, the neutral signature color selection is valid for printers with multiple drop sizes, for example ($C'_1$, $C'_2$, $M'_1$, $M'_2$, $Y'_1$, $Y'_2$) for two drop sizes, although more than three ink variables are involved. Similarly, only the three colorant variables need to be considered where multiple ink strengths are used, i.e., diluted and concentrated inks, alone or in combination with multiple drop sizes.

As set forth in greater detail below, the present invention method includes controller 18 executing instructions to determine colorant increment data based on a standard cartridge neutral variation signature color data 70 and a standard cartridge neutral sensitivity signature color data 72 associated with a standard cartridge 74, and based on a production cartridge neutral variation signature color data 76 and a production cartridge neutral sensitivity signature color data 78 associated with production cartridge 22 for which neutral color shift is to be corrected. The colorant increment data pertains to how much the individual cyan, magenta, and yellow colorant values output by colorspace converter 60 using standard color conversion lookup table 62 must be incremented or decremented in order for imaging apparatus 12 to produce printed output with production cartridge 22 that is similar to the printed output of imaging apparatus 12 using standard cartridge 74.

Standard cartridge neutral variation signature color data 70, standard cartridge neutral sensitivity signature color data 72, production cartridge neutral variation signature color data 76, and production cartridge neutral sensitivity signature color data 78 are each generally referred to as neutral signature color data.

The neutral signature color data for both standard cartridge 74 and production cartridge 22, are determined by selecting the neutral signature colors, printing patches corresponding to both the neutral variation and neutral sensitivity signature colors for the standard cartridge 74 and production cartridge 22, and by performing colorimetry measurement of those patches.

In the embodiment described, the colorimetry measurement is performed using a spectrophotometer to obtain device-independent CIELAB L*, a*, and b* values. However, it will be understood that any color measuring technique may be employed to obtain any color data suitable for performing neutral color shift correction without departing from the scope of the present invention.

Production cartridge 22 is the particular printing cartridge for which neutral color shift is to be corrected. Standard cartridge 74 is in the form of an average production cartridge 22, and is used for creating default color tables for each factory-supported substrate, such as standard color conversion lookup table 62. Accordingly, standard cartridge 74 is normally selected at the middle of the range of cartridge-to-cartridge color variations.

Figure 3:
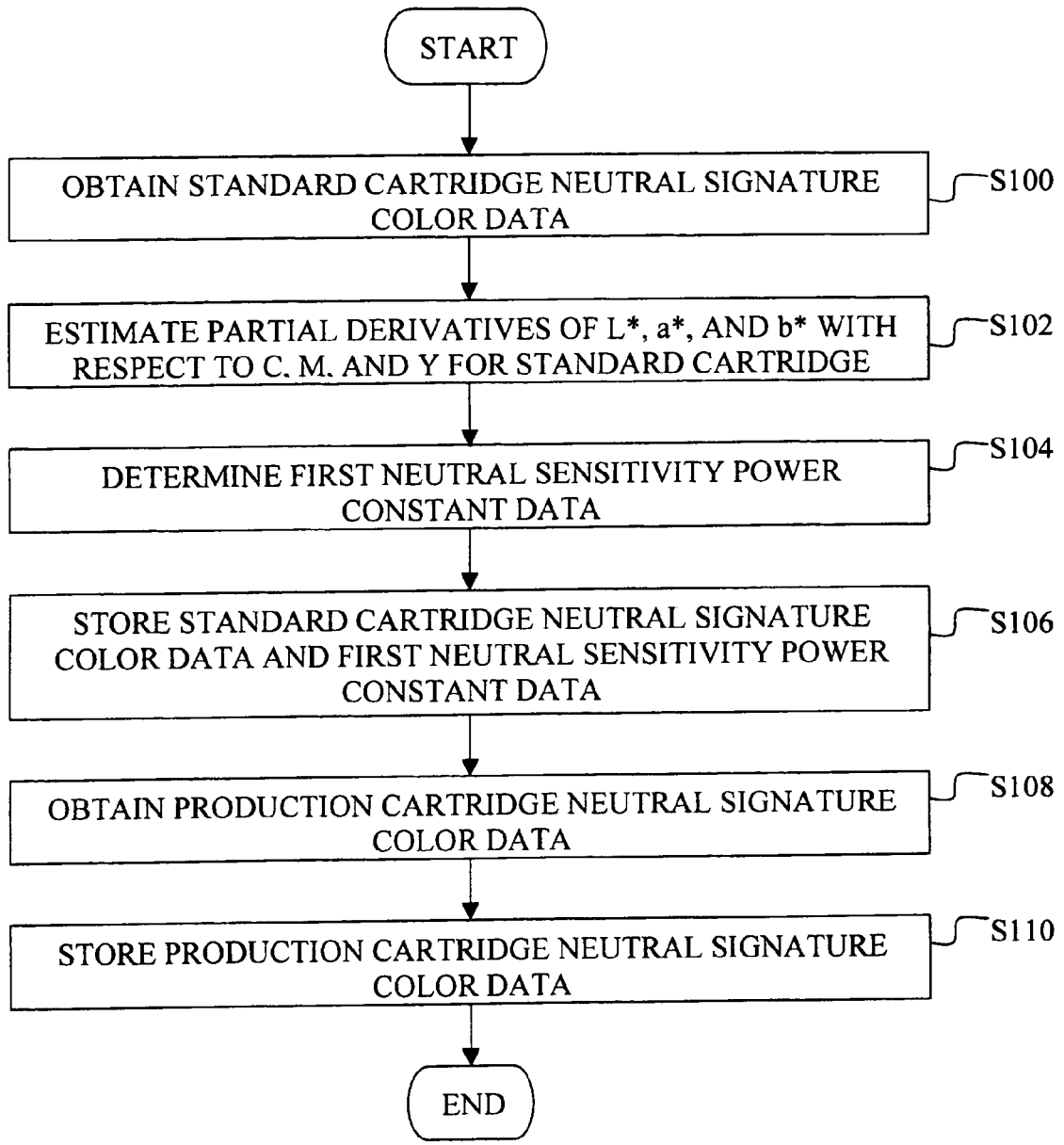
FIG. 3 is a flowchart that depicts method steps according to an embodiment of the present invention that take place at the factory.

Referring now to FIG. 3, steps S100-S106 describe a method for obtaining neutral signature color data, performed at the factory, e.g., the manufacturer of imaging apparatus 12 and/or production cartridge 22, and storing the neutral signature color data for later use by imaging apparatus 12 in performing neutral color shift correction.

At step S100, standard cartridge neutral signature color data, i.e., signature color data pertaining to standard cartridge 74, is obtained. The standard cartridge neutral signature color data includes standard cartridge neutral variation signature color data 70 and standard cartridge neutral sensitivity signature color data 72. Standard cartridge neutral variation signature color data 70 is used to represent the baseline color response to which the output of production cartridge 22 will be corrected by the present invention. Standard cartridge neutral sensitivity signature color data 72 includes color data obtained by measuring patches printed using standard cartridge 74. These patches include color points wherein small colorant changes that are barely perceptible to the human eye, i.e., ΔC, ΔM, or ΔY, for each patch are measured so that the sensitivity of L*, a*, and b* to small colorant changes, ΔC, ΔM, and ΔY, can be determined, i.e., ΔL*, Δa*, and Δb*. The step of obtaining neutral signature color data is described in more detail below with respect to steps S300 to S304.

At step S102, first partial derivatives of L*, a*, and b* with respect to C, M, and Y are estimated for standard cartridge 74. The estimation of the first partial derivatives of L*, a*, and b* with respect to C, M, and Y is described below in greater detail with respect to steps S400 to S404.

At step S104, first neutral sensitivity power constant data associated with standard cartridge 74 is determined based on standard cartridge neutral variation signature color data 70, standard cartridge neutral sensitivity signature color data 72, and the first partial derivatives estimated in step S102. The determination of neutral sensitivity power constant data is described in more detail below with respect to steps S500 and S502.

At step S106, standard cartridge neutral variation signature color data 70, standard cartridge neutral sensitivity signature color data 72, and the first neutral sensitivity power constant data are stored in a memory accessible to imaging system 10 and imaging apparatus 12, such as with imaging driver 58. Alternatively, it is contemplated that standard cartridge neutral variation signature color data 70, standard cartridge neutral sensitivity signature color data 72, and the first neutral sensitivity power constant data may be stored in memory 36 of controller 18.

As set forth above, steps S100-S106 are performed at the factory. Alternatively, it is contemplated that steps S102-S106 may be performed by imaging apparatus 12. For example, controller 18 may execute instructions to estimate the partial derivatives, and to determine the first neutral sensitivity power constant data, based on standard cartridge neutral variation signature color data 70, standard cartridge neutral sensitivity signature color data 72 and the partial derivatives.

At step S108, production cartridge neutral signature color data, i.e., signature color data pertaining to production cartridge 22, is obtained. The production cartridge neutral signature color data includes production cartridge neutral variation signature color data 76 and production cartridge neutral sensitivity signature color data 78. Here, production cartridge neutral variation signature color data 76 is used in conjunction with the baseline color response, standard cartridge neutral variation signature color data 70, to determine the difference in device-independent color data, ΔL*, Δa*, and Δb*, as between patches printed using production cartridge 22 and those printed using standard cartridge 74. Similar to standard cartridge neutral sensitivity signature color data 72, production cartridge neutral sensitivity signature color data 78 is used to determine the sensitivity of L*, a*, and b* values to small colorant changes ΔC, ΔM, and ΔY in patches printed by production cartridge 22, resulting in ΔL*, Δa*, and Δb*. The step of obtaining neutral signature color data is described in more detail below with respect to steps S300 to S304.

At step S110, production cartridge neutral variation signature color data 76 and production cartridge neutral sensitivity signature color data 78 are stored in a memory accessible to imaging system 10 and imaging apparatus 12, such as cartridge memory 24. Alternatively, it is contemplated that production cartridge neutral variation signature color data 76 and production cartridge neutral sensitivity signature color data 78 may be stored in offsite memory 34 of offsite computer 32 for access by imaging system 10 and imaging apparatus 12 via network 28.

As set forth above with respect to steps S100-S110, neutral signature color data for both standard cartridge 74 and production cartridge, and first neutral sensitivity power constant data have been established and stored for later access by imaging apparatus 12.

Figure 4:
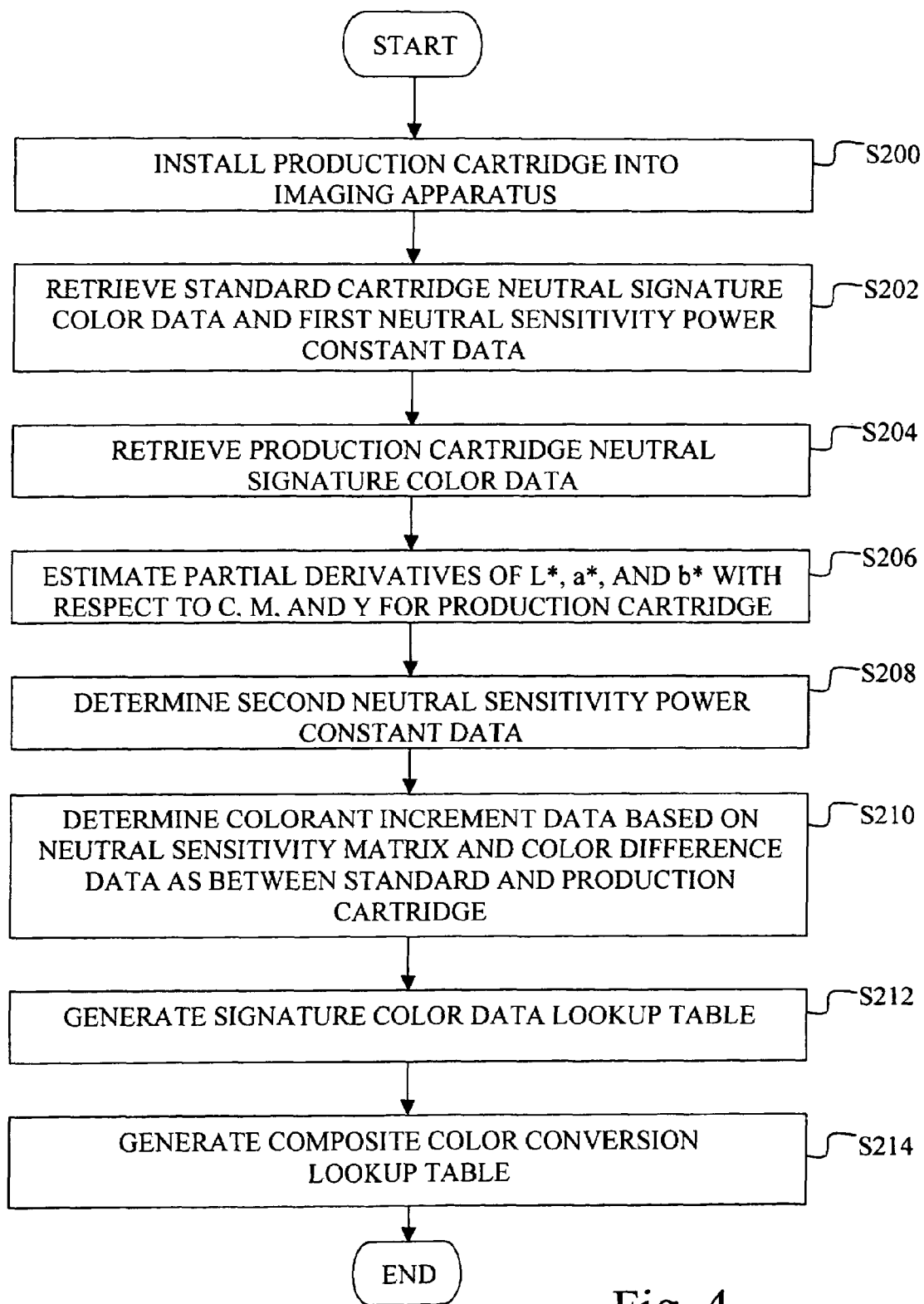
FIG. 4 is a flowchart that depicts method steps according to an embodiment of the present invention that take place in an imaging apparatus.

Referring now to FIG. 4, colorant increment data is determined, and neutral color shift correction implemented thereby, by imaging apparatus 12 for use in printing with production cartridge 22. The colorant increment data and corresponding neutral color shift correction is determined each time a production cartridge 22 is initially installed in imaging apparatus 12.

At step S200, production cartridge 22 is installed into print engine 20 of imaging apparatus 12.

At step S202, controller 18 executes instructions to retrieve standard cartridge neutral variation signature color data 70, standard cartridge neutral sensitivity signature color data 72, and first neutral sensitivity power constant data from memory, e.g., from imaging driver 58.

At step S204, controller 18 executes instructions to retrieve production cartridge neutral variation signature color data 76 and production cartridge neutral sensitivity signature color data 78 from memory.

At step S206, controller 18 executes instructions to estimate partial derivatives of L*, a*, and b* with respect to C, M, and Y for production cartridge 22. The estimation of the partial derivatives is described below in greater detail with respect to steps S400 to S404.

At step S208, controller 18 executes instructions to determine second neutral sensitivity power constant data associated with production cartridge 22, based on production cartridge neutral variation signature color data 76, production cartridge neutral sensitivity signature color data 78, and the partial derivatives estimated in step S206.

Alternatively, it is contemplated that the determination of second neutral sensitivity power constant data associated with production cartridge 22 may be performed at the factory during the manufacture of production cartridge 22, stored in cartridge memory 24, and retrieved by imaging apparatus 12 for use in performing neutral color correction according to the present invention. Another alternative is contemplated in that the determination of second neutral sensitivity power constant data associated with production cartridge 22 may be performed at the factory during the manufacture of production cartridge 22, stored in offsite memory 34 of offsite computer 32 for access by imaging system 10 and imaging apparatus 12 via network 28, and retrieved for use by imaging apparatus 12 in performing neutral color correction according to the present invention The determination of neutral sensitivity power constant data is described in more detail below with respect to steps S500 and S502 (see FIG. 9).

At step S210, controller 18 executes instructions to determine the colorant increment data based on a neutral sensitivity matrix and based on color difference data as between standard cartridge 74 and production cartridge 22. The color difference data is based on standard cartridge neutral variation signature color data 70, standard cartridge neutral sensitivity signature color data 72, production cartridge neutral variation signature color data 76, and production cartridge neutral sensitivity signature color data 78. The neutral sensitivity matrix is determined based on production cartridge neutral variation signature color data 76 and production cartridge neutral sensitivity signature color data 78, and is descriptive of the sensitivity of device-independent L*a*b* color data to a change in a device-dependent CMY color data, e.g., the color difference data ΔL*, Δa*, and Δb* pertaining to the difference in device-independent color output produced using standard cartridge 74 and that produced using production cartridge 22.

The neutral sensitivity matrix includes neutral sensitivity power constant data. In the preferred embodiment, the determination of the colorant increment data is based on using the first neutral sensitivity power constant data in the neutral sensitivity matrix, in order to reduce computational complexity, assuming that the difference between first neutral sensitivity power constant data and second neutral sensitivity power constant data represents second or third order effects upon the colorant increment data. Alternatively, however, it is contemplated that the colorant increment data may be determined based on the neutral sensitivity matrix employing second neutral sensitivity power constant data, or a combination of first neutral sensitivity power constant data and second neutral sensitivity power constant data, such as an average or a weighted average.

The determination of the colorant increment data is described in more detail below with respect to steps S600 to S604 (see FIG. 10).

At step S212, controller 18 executes instructions to generate signature color data lookup table 64 based on the colorant increment data, thus placing the colorant increment data in a form similar to that of standard color conversion lookup table 62.

At step S214, controller 18 executes instructions to combine signature color data lookup table 64 with standard color conversion lookup table 62 to generate composite color conversion lookup table 66 for use in printing with production cartridge 22.

Figure 5:
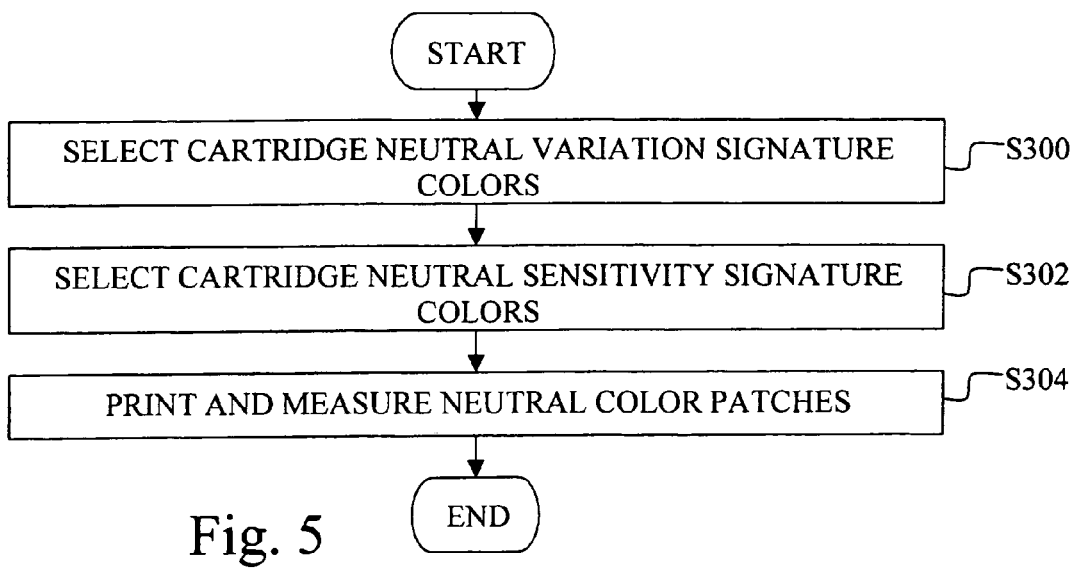
FIG. 5 is a flowchart that depicts a method for obtaining neutral signature colors in accordance with the present invention.

Referring now to FIG. 5, the procedure for obtaining of neutral signature color data, as performed in steps S100 and S108 illustrated in FIG. 3, is now described in greater detail with reference to steps S300 to S304.

In order to optimally correct neutral color shift, it is preferable to know how much color shift occurs (neutral variation), and how the color shift is affected by small colorant changes in the neutral neighborhood (neutral sensitivity), e.g., along the neutral axis from the white point to the black point in colorspace. Thus, two kinds of neutral signature colors are defined for each production cartridge 22 and standard cartridge 74: neutral variation signature colors and neutral sensitivity signature colors.

The neutral variation signature colors, standard cartridge neutral variation signature color data 70 and production cartridge neutral variation signature color data 76, are used to determine the difference in neutral color output of imaging apparatus 12 as between production cartridge 22 and standard cartridge 74. Standard cartridge neutral sensitivity signature color data 72 and production cartridge neutral sensitivity signature color data 78 are used to determine a sensitivity of the neutral color shift to a colorant change, for example, the sensitivity of L*, a*, and/or b* values to changes in C, M, and/or Y values.

At step S300, the cartridge neutral variation signature colors for production cartridge 22 and standard cartridge 74 are selected as follows.

Along the neutral axis from white (C=M=Y=0) diagonally to black (C=M=Y=255), select $n_1$ evenly-spaced points over the whole range. When these neutral color points are sent to imaging apparatus 12 for printing, the printed color (gray) patches will be measured with the spectrophotometer to give the following CIELAB values:

$$L^* = f_L(C=M=Y) \quad \text{Equation (1)}$$

$$a^* = f_a(C=M=Y) \quad \text{Equation (2)}$$

$$b^* = f_b(C=M=Y) \quad \text{Equation (3)}$$

where C, M, and Y are the monitor cyan, magenta, and yellow colorant values, and f denotes that L*, a*, and b* are the functions of C, M, and Y. The cartridge color variations, e.g., the color shift between production cartridge 22 and standard cartridge 74, will be reflected in the color values L*, a*, and b*.

At step S302, the neutral sensitivity signature colors are selected. In order to select the neutral sensitivity colors for each of production cartridge 22 and standard cartridge 74, among the neutral variation points chosen above, m relatively evenly-spaced points are selected. At the neighborhood of each of the m points, 3 points are selected such that each of them varies only one of the 3 colorants C, M, or Y by a small amount ($\Delta C$, $\Delta M$, and $\Delta Y$) that yields small color changes ($\Delta L^*$, $\Delta a^*$, and $\Delta b^*$) that are perceptible to the human eye. Preferably, the color changes are at or near the lower limit of human perception. Thus there will be $n_2=3m$ neutral sensitivity points. The color values of each of the m points may be represented by:

(1) for changing C only:

$$L_C^* = g_{LC}(C-\Delta C, M=Y) \quad \text{Equation (4)}$$

$$a_C^* = g_{aC}(C-\Delta C, M=Y) \quad \text{Equation (5)}$$

$$b_C^* = g_{bC}(C-\Delta C, M=Y) \quad \text{Equation (6)}$$

(2) for changing M only:

$$L_M^* = g_{LM}(M-\Delta M, C=Y) \quad \text{Equation (7)}$$

$$a_M^* = g_{aM}(M-\Delta M, C=Y) \quad \text{Equation (8)}$$

$$b_M^* = g_{bM}(M-\Delta M, C=Y) \quad \text{Equation (9)}$$

(3) for changing Y only:

$$L_Y^* = g_{LY}(Y-\Delta Y, C=M) \quad \text{Equation (10)}$$

$$a_Y^* = g_{aY}(Y-\Delta Y, C=M) \quad \text{Equation (11)}$$

$$b_Y^* = g_{bY}(Y-\Delta Y, C=M) \quad \text{Equation (12)}$$

where, subscripts $_C$, $_M$, and $_Y$ denote that only C, M or Y, respectively, are changed, $\Delta C$, $\Delta M$, and $\Delta Y$ represent the small amount changes of cyan, magenta, and yellow, respectively, g denotes the functional relationships, and L*, a*, and b* denote the CIELAB device-independent color values.

An example of neutral signature color selection is now described.

The inventors have discovered that selecting $n_1=17$, and $m=4$ ($n_2=3m=12$) yields reasonable results without requiring excessive computational intensity. That is, 17 neutral variation points and 12 neutral sensitivity points, for a total of 29 neutral signature color points were found to provide acceptable neutral color shift correction.

The 17 points are evenly-spaced over the whole range along the neutral axis from white to black, for example, with index values ranging from 0 to 16, where 0 represents the white point, and 16 represent the black point. The m=4 points are chosen from the 17 points at index values of 2, 6, 10, and 14. The varied amount at each index, i.e., the small mount colorant variation that yields small color changes, is 6, 8, 12, and 16, respectively, and at a given index the varied amount is the same for cyan, magenta, and yellow. For example, at index=2, we have one neutral variation point (one of the 17 points): (C,M,Y)=(32, 32, 32), and three neutral sensitivity points: (C−$\Delta$C,M,Y)=(26, 32, 32), (C,M−$\Delta$M,Y)=(32, 26, 32), and (C,M,Y−$\Delta$Y)=(32, 32, 26), where $\Delta C=\Delta M=\Delta Y=6$. For any points along the neutral axis without measured color values, an interpolation scheme such as linear interpolation may be employed to find the corresponding CIELAB L*, a*, and b* color values.

At step S304, a plurality of patches are printed using both production cartridge 22 and standard cartridge 74, and are measured. Standard cartridge neutral variation signature color data 70 and standard cartridge neutral sensitivity signature color data 72 are obtained based on performing printing and colorimetry measuring of a first plurality of neutral variation color patches 80 and a first plurality of neutral sensitivity color patches 82, respectively. In addition, production cartridge neutral variation signature color data 76 and production cartridge neutral sensitivity signature color data 78 are obtained based on performing printing and colorimetry measuring of a second plurality of neutral variation color patches 84 and a second plurality of neutral sensitivity color patches 86, respectively, that are associated with production cartridge 22.

Figure 6:
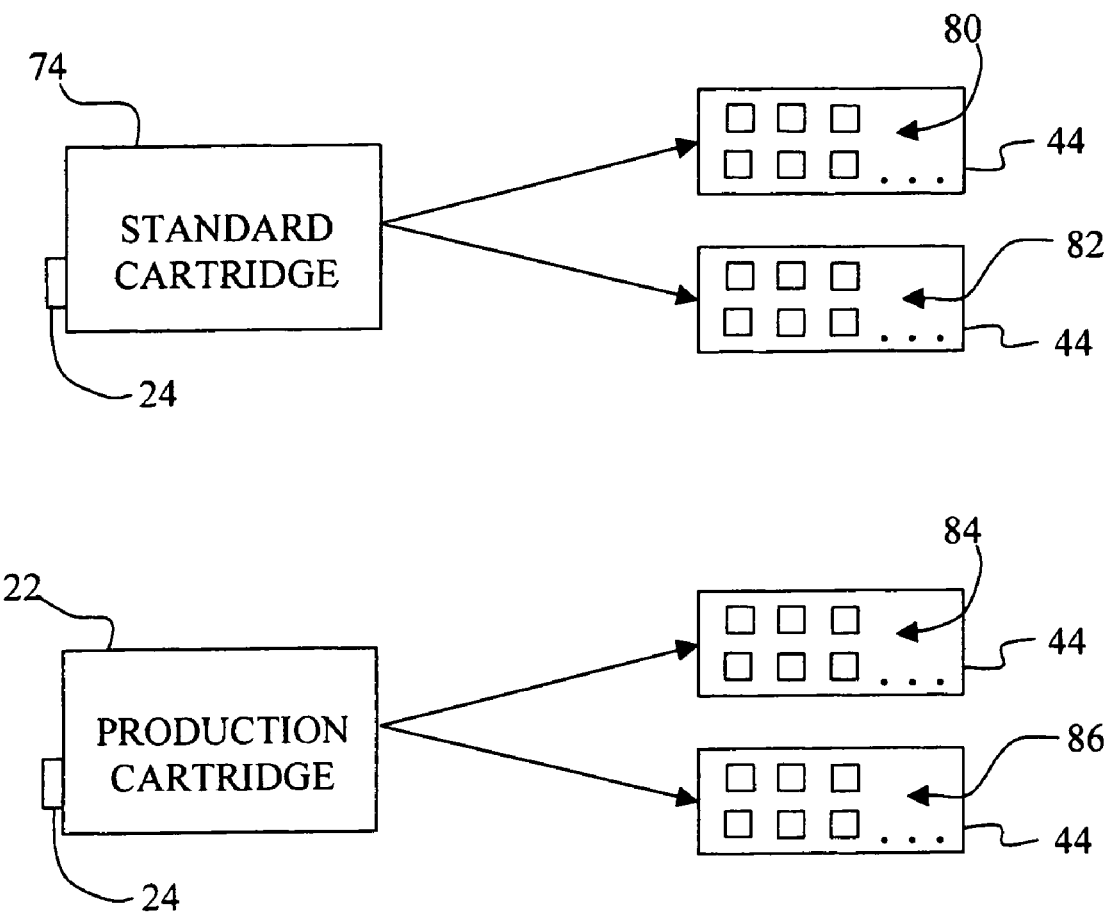
FIG. 6 is a diagram depicting the printing of test patches used to obtain signature color data according to the present invention.

For example, referring now to FIG. 6, standard cartridge 74 is diagrammatically depicted as printing first plurality of neutral variation color patches 80 and first plurality of neutral sensitivity color patches 82. In addition, production cartridge 22 is diagrammatically depicted as printing second plurality of neutral variation color patches 84 and second plurality of neutral sensitivity color patches 86.

Figure 7:
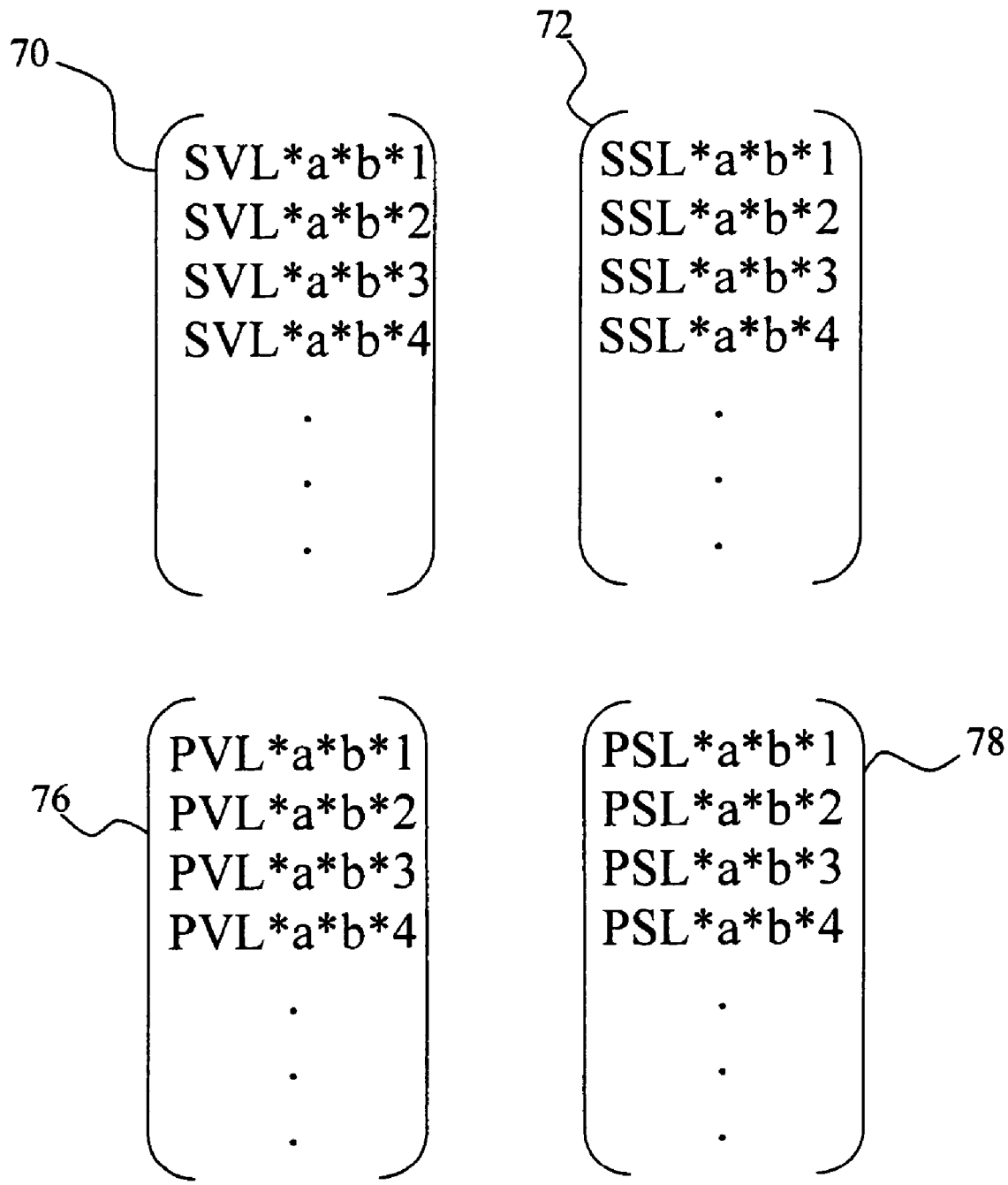
FIG. 7 is a graphical representation of signature color data employed by the present invention.

Referring now to FIG. 7, standard cartridge neutral variation signature color data 70, standard cartridge neutral sensitivity signature color data 72, production cartridge neutral variation signature color data 76, and production cartridge neutral sensitivity signature color data 78 are depicted as being CIELAB device-independent L*a*b* color data obtained by the spectrophotometer colorimetry measurement of first plurality of neutral variation color patches 80, first plurality of neutral sensitivity color patches 82, second plurality of neutral variation color patches 84, and second plurality of neutral sensitivity color patches 86, respectively.

Having been thus determined, standard cartridge neutral variation signature color data 70, standard cartridge neutral sensitivity signature color data 72, production cartridge neutral variation signature color data 76, and production cartridge neutral sensitivity signature color data 78 are stored as set forth in steps S106 and S110, respectively.

As previously indicated, production cartridge 22 is installed at step S200, and then controller 18 executes instructions to retrieve standard cartridge neutral variation signature color data 70, standard cartridge neutral sensitivity signature color data 72, and first neutral sensitivity power constant data at step S202, and to retrieve production cartridge neutral variation signature color data 76 and production cartridge neutral sensitivity signature color data 78 at step S204.

Figure 8:
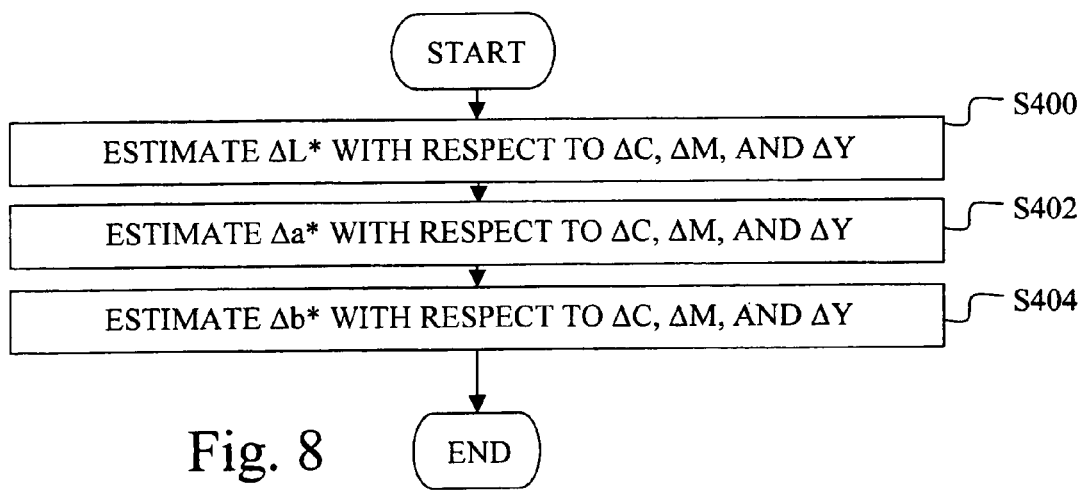
FIG. 8 is a flowchart that depicts a method according to the present invention for estimating a sensitivity of device-independent color data to a change in device-dependent color data.

Referring now to FIG. 8, the estimation of the first partial derivatives of L*, a*, and b*, with respect to C, M, and Y, establishing a mathematical relationship between L*, a*, and b*, C, M, and Y, and $\Delta C$, $\Delta M$, and $\Delta Y$, as performed in step S102 of FIG. 3 and step S206 of FIG. 4, is described with reference to steps S400-S404.

At step S400, $\Delta L^*$ is estimated as follows.

As shown in Equation 1, above, the lightness (L*) is a function of (C,M,Y). It is assumed that the lightness function possesses first partial derivatives with respect to C, M, and Y throughout some region of space. When the function is moved from a point (C,M,Y) to a neighboring point (C+$\Delta C$, M+$\Delta M$, Y+$\Delta Y$), the lightness will change by an amount $\Delta L^*$ whose exact value, as similarly derived in calculus, is given by:

$$\Delta L^* = \left(\frac{\partial L^*}{\partial C} + \varepsilon_{LC}\right)\Delta C + \left(\frac{\partial L^*}{\partial M} + \varepsilon_{LM}\right)\Delta M + \left(\frac{\partial L^*}{\partial Y} + \varepsilon_{LY}\right)\Delta Y \quad \text{Equation (13)}$$

where $\varepsilon_{LC}$, $\varepsilon_{LM}$, $\varepsilon_{LY}$ are error quantities which approach zero as $\Delta C$, $\Delta M$, and $\Delta Y$ approach zero, and $\partial L^*/\partial C$, $\partial L^*/\partial M$, $\partial L^*/\partial Y$ are first partial derivatives with respect to C, M, and Y, respectively, at point (C,M,Y).

Using measurement results, the first partial derivatives are estimated by changing small amounts of C, M, and Y, with one colorant change per point, i.e., $\Delta C$, $\Delta M$, or $\Delta Y$, in a small neighborhood, giving:

$$E_{LC} = \frac{\Delta L_C^*}{\Delta C}\left(\approx \frac{\partial L^*}{\partial C}\right) \quad \text{Equation (14)}$$

$$E_{LM} = \frac{\Delta L_M^*}{\Delta M}\left(\approx \frac{\partial L^*}{\partial M}\right) \quad \text{Equation (15)}$$

$$E_{LY} = \frac{\Delta L_Y^*}{\Delta Y}\left(\approx \frac{\partial L^*}{\partial Y}\right) \quad \text{Equation (16)}$$

Considering the error quantities $\varepsilon_{LC}$, $\varepsilon_{LM}$, $\varepsilon_{LY}$, each of the first partial derivative estimates in Equations 14-16 is raised to a power as a full estimate of the first partial derivative together with the respective error quantity, $\varepsilon_{LC}$, $\varepsilon_{LM}$, or $\varepsilon_{LY}$, shown in the parentheses of Equation 13. That is, $$(E_{LC})^{P_{LC}} \approx \frac{\partial L^*}{\partial C} + \varepsilon_{LC} \quad \text{Equation (17)}$$

$$(E_{LM})^{P_{LM}} \approx \frac{\partial L^*}{\partial M} + \varepsilon_{LM} \quad \text{Equation (18)}$$

$$(E_{LY})^{P_{LY}} \approx \frac{\partial L^*}{\partial Y} + \varepsilon_{LY} \quad \text{Equation (19)}$$

Substituting Equations 17-19 in Equation 13 gives:

$$\Delta L^* \approx (E_{LC})^{P_{LC}}\Delta C + (E_{LM})^{P_{LM}}\Delta M + (E_{LY})^{P_{LY}}\Delta Y \quad \text{Equation (20)}$$

At step S402, $\Delta a^*$ is estimated in the same manner as $\Delta L^*$. For example, replacing L* in the above equations with a* yields equations 21-24 as follows:

$$E_{aC} = \frac{\Delta a_C^*}{\Delta C}\left(\approx \frac{\partial a^*}{\partial C}\right) \quad \text{Equation (21)}$$

$$E_{aM} = \frac{\Delta a_M^*}{\Delta M}\left(\approx \frac{\partial a^*}{\partial M}\right) \quad \text{Equation (22)}$$

$$E_{aY} = \frac{\Delta a_Y^*}{\Delta Y}\left(\approx \frac{\partial a^*}{\partial Y}\right) \quad \text{Equation (23)}$$

$$\Delta a^* \approx (E_{aC})^{P_{aC}}\Delta C + (E_{aM})^{P_{aM}}\Delta M + (E_{aY})^{P_{aY}}\Delta Y \quad \text{Equation (24)}$$

At step S404, $\Delta b^*$ is estimated in the same manner as $\Delta L^*$. For example, replacing L* in the above equations with b* yields equations 25-28 as follows:

$$E_{bC} = \frac{\Delta b_C^*}{\Delta C} \left( \approx \frac{\partial b^*}{\partial C} \right) \quad \text{Equation (25)}$$

$$E_{bM} = \frac{\Delta b_M^*}{\Delta M} \left( \approx \frac{\partial b^*}{\partial M} \right) \quad \text{Equation (26)}$$

$$E_{bY} = \frac{\Delta b_Y^*}{\Delta Y} \left( \approx \frac{\partial b^*}{\partial Y} \right) \quad \text{Equation (27)}$$

$$\Delta b^* \approx (E_{bC})^{P_{bC}} \Delta C + (E_{bM})^{P_{bM}} \Delta M + (E_{bY})^{P_{bY}} \Delta Y \quad \text{Equation (28)}$$

Here, the 9 quantities $P_{LC}, P_{LM}, \ldots, P_{bY}$ in Equations 17-28 are neutral sensitivity power constants.

Estimating the neutral sensitivity power constants is now described in greater detail with reference to steps S500 and S502.

Before the neutral color correction determination can be performed, the neutral sensitivity power constants in Equation 29 must be known. Hence the neutral sensitivity power constants are determined for standard cartridge 74 and production cartridge 22, i.e., a first neutral sensitivity power constant data and a second neutral sensitivity power constant data, respectively. First neutral sensitivity power constant data and second neutral sensitivity power constant data are determined as follows, based on the neutral sensitivity signature color points selected as indicated in step S302, and employing the color values of the neutral sensitivity signature color points to determine the first partial derivatives (Equations 14-16, 21-23, 25-27).

Figure 9:
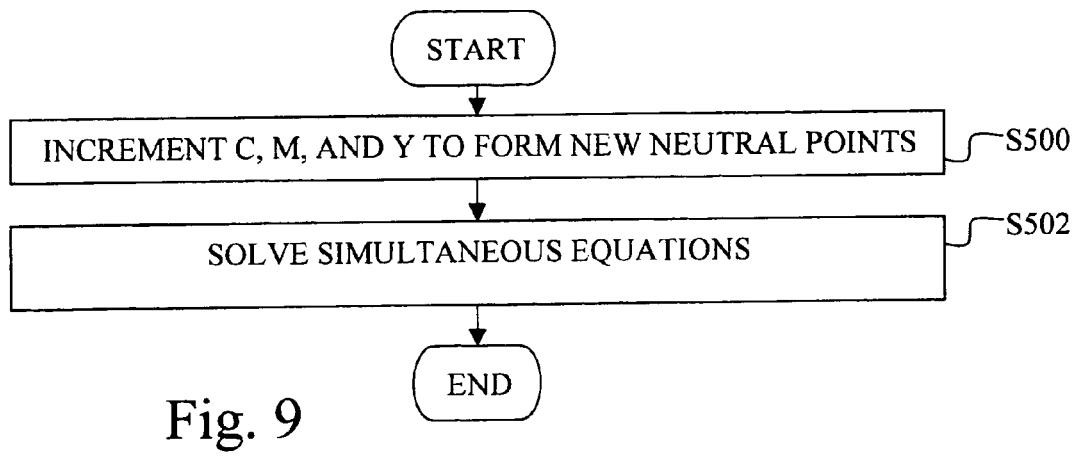
FIG. 9 is a flowchart that depicts a method according to the present invention for estimating neutral sensitivity power constants.

Referring now to FIG. 9, the determination of neutral sensitivity power constant data according to step S210 of FIG. 4 is described in greater detail with respect to steps S500 and S502.

At step S500, for each of the neutral sensitivity points with C=M=Y, e.g., the 4 sensitivity points on the neutral line shown set forth above with respect to step S100, small increments of $\Delta C$, $\Delta M$, and $\Delta Y$ are taken, in order to form new points in the neutral or near neutral neighborhood. Step S500 is performed both for standard cartridge 74 and production cartridge 22.

At step S502 simultaneous equations are solved to find first neutral sensitivity power constant data and second neutral sensitivity power constant data. For example, a pair of the points determined in step S500 will give the color differences $\Delta L^*$, $\Delta a^*$, and $\Delta b^*$, and may be used to form three simultaneous Equations 20, 24, 28. At least 3 pairs of these points are selected to form 3×3 simultaneous equations in order to find the 9 unknown power constants using mathematical methods familiar to those skilled in the art. Preferably, more than 3 pairs of the points are employed, so that a least-square or other optimization method may be used to find the optimum solution.

The inventors have discovered that selecting power constants as 1.0 can generally give reasonable neutral color corrections. However, for more accurate results, it is preferable to find different sets of neutral sensitivity power constants for different substrates. These can be determined in manufacturing and stored in memory 36 of controller 18 and/or in imaging driver 58 for use by imaging apparatus 12.

Figure 10:
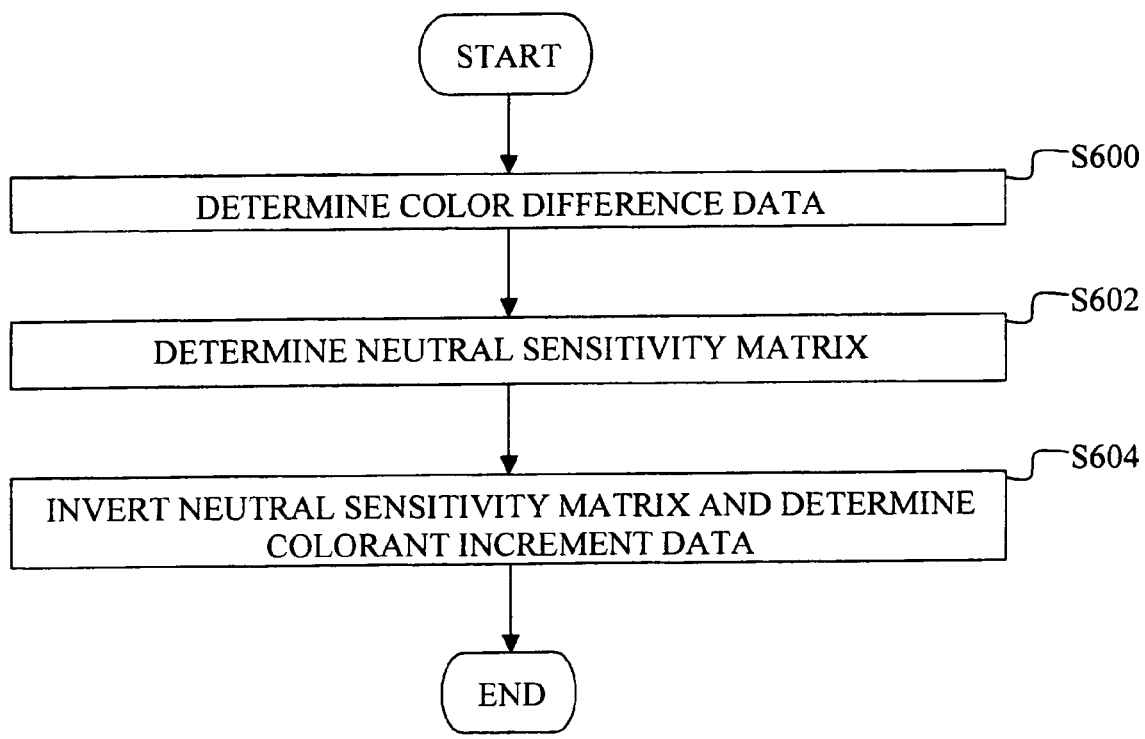
FIG. 10 is a flowchart that depicts the details of a method according to the present invention for determining colorant increment data using a neutral sensitivity matrix and neutral color difference data.

Referring now to FIG. 10, the colorant increment data is determined based on the neutral sensitivity matrix and the color difference data, described with reference steps S600 to S604. The neutral sensitivity matrix and color difference data is determined based at least in part on standard cartridge neutral variation signature color data 70, standard cartridge neutral sensitivity signature color data 72, production cartridge neutral variation signature color data 76, and production cartridge neutral sensitivity signature color data 78.

At step S600, controller 18 executes instructions to determine the color difference data, $\Delta L^*$, $\Delta a^*$, and $\Delta b^*$, by subtracting the measured values of standard cartridge neutral variation signature color data 70 and standard cartridge neutral sensitivity signature color data 72 from production cartridge neutral variation signature color data 76 and production cartridge neutral sensitivity signature color data 78, respectively.

At step S602, controller 18 executes instructions to determine the neutral sensitivity matrix is by placing Equations 20, 24, and 28 in matrix form, as follows:

$$\begin{bmatrix} (E_{LC})^{P_{LC}} & (E_{LM})^{P_{LM}} & (E_{LY})^{P_{LY}} \\ (E_{aC})^{P_{aC}} & (E_{aM})^{P_{aM}} & (E_{aY})^{P_{aY}} \\ (E_{bC})^{P_{bC}} & (E_{bM})^{P_{bM}} & (E_{bY})^{P_{bY}} \end{bmatrix} \begin{bmatrix} \Delta C \\ \Delta M \\ \Delta Y \end{bmatrix} = \begin{bmatrix} \Delta L^* \\ \Delta a^* \\ \Delta b^* \end{bmatrix} \quad \text{Equation (29)}$$

or $$Ax=u \quad \text{Equation (30)}$$

where $$A = \begin{bmatrix} (E_{LC})^{P_{LC}} & (E_{LM})^{P_{LM}} & (E_{LY})^{P_{LY}} \\ (E_{aC})^{P_{aC}} & (E_{aM})^{P_{aM}} & (E_{aY})^{P_{aY}} \\ (E_{bC})^{P_{bC}} & (E_{bM})^{P_{bM}} & (E_{bY})^{P_{bY}} \end{bmatrix} \quad \text{Equation (31)}$$

$$x=[\Delta C \; \Delta M \; \Delta Y]^T \quad \text{Equation (32)}$$

$$u=[\Delta L^* \; \Delta a^* \; \Delta b^*]^T \quad \text{Equation (33)}$$

Here, A represents the neutral sensitivity matrix, x is the colorant increment data in the form of a colorant increment matrix, u is the color difference data in the form of a color difference matrix, and the superscript, "T", indicates a matrix transpose function.

At step S604, the colorant increment data is determined as follows: By virtue of Equation 30, for a known A and x, a color difference matrix, u, can be determined. For neutral color correction, however, A and u are known, but x is unknown. Thus, at step S604, an inverse matrix computation is performed to determine the colorant increment data in the form of a colorant increment matrix:

$$x=A^{-1}u \quad \text{Equation (34)}$$

Based on algebra theory, there is a unique solution for x if A is square and non-singular ($|A|\neq 0$). Here A is square (3×3 matrix). In practice, the determinant ($|A|$) of neutral sensitivity matrix (A) will not be zero. Therefore, a solution for the colorant increment matrix, hence the colorant increment data, is found. The colorant increment data pertains to how much the individual cyan, magenta, and yellow colorant values output by colorspace converter 60 using standard color conversion lookup table 62 must be incremented or decremented in order for imaging apparatus 12 to produce printed output with production cartridge 22 that is similar to the printed output of imaging apparatus 12 using standard cartridge 74.

A brief example of performing neutral color correction in accordance with the present invention is now provided.

First, neutral signature color values and the neutral sensitivity power constants of the standard cartridge 74 stored in imaging driver 58, and the neutral signature colors of production cartridge 22 stored in cartridge memory, are read by controller 18 of imaging apparatus 12. Then, the first partial derivatives are determined (Equations 14-16, 21-23, 25-27) using neutral sensitivity signature colors (Equations 4-12), together with the associated neutral variation colors (Equations 1-3). For example, three neutral sensitivity points are (C−ΔC, M, Y), (C, M−ΔM, Y), (C,M,Y−ΔY), and the associated neutral variation point will be (C,M,Y). The color differences will be equal to the sensitivity point colors subtracted from the neutral variation point colors.

The neutral sensitivity matrix (A of Equation 30) is then determined using the first partial derivatives and neutral sensitivity power constants (Equation 29), and the neutral color difference matrix (u of Equation 30 or 33) is determined using the neutral variation signature colors of the standard and current cartridges. The neutral sensitivity matrix (A of Equation 30) is then inverted, and the neutral colorant increment data, i.e., the colorant increment matrix (Equation 30 or 32) is determined.

The signature color data lookup table 64 is then generated, and the neutral portion of the standard color conversion lookup table 62 is modified by combining signature color data lookup table 64 with standard color conversion lookup table 62 to generate composite color conversion lookup table 66, which is stored in imaging driver 58 for use in printing with production cartridge 22. By using composite color conversion lookup table 66, the neutral color output of imaging apparatus 12 using production cartridge 22 will be similar to output generated using standard cartridge 74.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method for correcting neutral color shift in a production cartridge for use in an imaging system, comprising:
   determining a colorant increment data by a controller based on a standard cartridge neutral variation signature color data and a standard cartridge neutral sensitivity signature color data associated with a standard cartridge, and based on a production cartridge neutral variation signature color data and a production cartridge neutral sensitivity signature color data associated with said production cartridge; and
   using said colorant increment data to correct said neutral color shift, wherein the neutral variation signature color data is obtained by:
      selecting m evenly spaced neutral variation points along a neutral axis from white point diagonally to black point; and
      printing the selected neutral variation points to measure a device independent L*, a*, and b* values,
   and wherein the neutral sensitivity signature color data is obtained by:
      selecting n points from the m neutral variation points; and
      determining three points around each of the n selected points, each of three determined points varies only in one of three colorant C, M, and Y by a small amount, such that m and n both are integers and m is greater than n.

2. The method of claim 1, wherein at least one of said standard cartridge neutral sensitivity signature color data and said production cartridge neutral sensitivity signature color data is used to determine a sensitivity of said neutral color shift to a colorant change.

3. The method of claim 2, wherein said colorant increment data is determined based on estimating a change in at least one device-independent colorspace color component resulting from said colorant change.

4. The method of claim 3, further comprising:
   determining a neutral sensitivity matrix, said neutral sensitivity matrix being descriptive of a sensitivity of a device-independent color data to a change in a device-dependent color data, wherein said determining said colorant increment data is based at least in part on said neutral sensitivity matrix.

5. The method of claim 3, further comprising:
   determining a first neutral sensitivity power constant data associated with said standard cartridge based on said standard cartridge neutral variation signature color data and said standard cartridge neutral sensitivity signature color data,
   wherein said determining said colorant increment data is based at least in part on said first neutral sensitivity power constant data.

6. The method of claim 3, further comprising:
   determining a second neutral sensitivity power constant data associated with said production cartridge based on said production cartridge neutral variation signature color data and said production cartridge neutral sensitivity signature color data,
   wherein said determining said colorant increment data is based at least in part on said second neutral sensitivity power constant data.

7. The method of claim 2, further comprising:
   determining a color difference data based on said standard cartridge neutral variation signature color data, said standard cartridge neutral sensitivity signature color data, said production cartridge neutral variation signature color data, and said production cartridge neutral sensitivity signature color data,
   wherein said determining said colorant increment data is based at least in part on said color difference data.

8. The method of claim 2, further comprising:
   generating a signature color data lookup table based on said colorant increment data.

9. The method of claim 8, wherein said imaging system includes an imaging apparatus accessing a standard color conversion lookup table, further comprising:
   combining said signature color data lookup table with said standard color conversion lookup table to generate a composite color conversion lookup table for use in printing with said production cartridge.

10. The method of claim 2, wherein said imaging system includes an imaging apparatus, said method further comprising:
   storing said production cartridge neutral variation signature color data and said production cartridge neutral sensitivity signature color data in a memory accessible by said imaging system;
   installing said production cartridge into said imaging apparatus; and
   retrieving said production cartridge neutral variation signature color data and said production cartridge neutral sensitivity signature color data from said memory.

11. The method of claim 10, wherein said memory is a cartridge memory of said production cartridge.

12. The method of claim 10, wherein said memory is an offsite memory accessed using a network.

13. The method of claim 2, wherein said imaging system includes an imaging apparatus, said method further comprising:
storing said standard cartridge neutral variation signature color data and said standard cartridge neutral sensitivity signature color data into a memory accessible by said imaging system;
installing said production cartridge into said imaging apparatus; and
retrieving said standard cartridge neutral variation signature color data and said standard cartridge neutral sensitivity signature color data from said memory.

14. The method of claim 1, wherein:
said standard cartridge neutral variation signature color data and said standard cartridge neutral sensitivity signature color data are obtained based on performing printing and colorimetry measuring of a first plurality of neutral variation color patches and a first plurality of neutral sensitivity color patches, respectively; and
said production cartridge neutral variation signature color data and said production cartridge neutral sensitivity signature color data are obtained based on performing printing and colorimetry measuring of a second plurality of neutral variation color patches and a second plurality of neutral sensitivity color patches, respectively.

15. An imaging apparatus, comprising:
a print engine configured to mount a production cartridge; and
a controller communicatively coupled to said print engine, said controller executing instructions to determine a colorant increment data based on a standard cartridge neutral variation signature color data and a standard cartridge neutral sensitivity signature color data associated with a standard cartridge, and based on a production cartridge neutral variation signature color data and a production cartridge neutral sensitivity signature color data associated with said production cartridge, and said controller executing instructions to use said colorant increment data to correct said neutral color shift, wherein the neutral variation signature color data is obtained by selecting m evenly spaced neutral variation points along a neutral axis from white point diagonally to black point and printing the neutral variation points to measure a device independent L*, a*, and b* values, and
wherein the neutral sensitivity signature color data is obtained by selecting n points from the m neutral variation points and determining three points around each of the n selected points such that each of three determined points varies only in one of three colorant C, M, and Y by a small amount, where m and n both are integers and m is greater than n.

16. The imaging apparatus of claim 15, wherein at least one of said standard cartridge neutral sensitivity signature color data and said production cartridge neutral sensitivity signature color data is used to determine a sensitivity of said neutral color shift to a colorant change.

17. The imaging apparatus of claim 16, wherein said colorant increment data is determined based on estimating a change in at least one device-independent colorspace color component resulting from said colorant change.

18. The imaging apparatus of claim 17, said controller further executing instructions to:
determine a neutral sensitivity matrix, said neutral sensitivity matrix being descriptive of a sensitivity of a device-independent color data to a change in a device-dependent color data,
wherein said colorant increment data is determined based at least in part on said neutral sensitivity matrix.

19. The imaging apparatus of claim 17, said controller executing instructions to determine said colorant increment data based at least in part on a first neutral sensitivity power constant data associated with said standard cartridge determined based on said standard cartridge neutral variation signature color data and said standard cartridge neutral sensitivity signature color data.

20. The imaging apparatus of claim 17, said controller further executing instructions to: determine a second neutral sensitivity power constant data associated with said production cartridge based on said production cartridge neutral variation signature color data and said production cartridge neutral sensitivity signature color data, wherein said colorant increment data is determined based at least in part on said second neutral sensitivity power constant data.

21. The imaging apparatus of claim 16, said controller further executing instructions to:
determine a color difference data based on said standard cartridge neutral variation signature color data, said standard cartridge neutral sensitivity signature color data, said production cartridge neutral variation signature color data, and said production cartridge neutral sensitivity signature color data,
wherein said colorant increment data is determined based at least in part on said color difference data.

22. The imaging apparatus of claim 16, further comprising:
a memory storing said standard cartridge neutral variation signature color data and said standard cartridge neutral sensitivity signature color data; and
said controller further executing instructions to retrieve said standard cartridge neutral variation signature color data and said standard cartridge neutral sensitivity signature color data from said memory.

23. The imaging apparatus of claim 16, said controller further executing instructions to:
generate a signature color data lookup table based on said colorant increment data.

24. The imaging apparatus of claim 23, wherein said imaging apparatus has access to a standard color conversion lookup table, said controller further executing instructions to:
combine said signature color data lookup table with said standard color conversion lookup table to generate a composite color conversion lookup table for use in printing with said production cartridge.

25. The imaging apparatus of claim 16, further comprising:
a memory storing said production cartridge neutral variation signature color data and said production cartridge neutral sensitivity signature color data,
wherein:
upon an installation of said production cartridge into said imaging apparatus, said controller further executing instructions to retrieve said production cartridge neutral variation signature color data and said production cartridge neutral sensitivity signature color data from said memory.

26. The imaging apparatus of claim 25, wherein said memory is a cartridge memory of said production cartridge.

27. The imaging apparatus of claim 25, wherein said memory is an offsite memory accessed using a network.

28. The imaging apparatus of claim 15, wherein:

said standard cartridge neutral variation signature color data and said standard cartridge neutral sensitivity signature color data are obtained based on performing printing and colorimetry measuring of a first plurality of neutral variation color patches and a first plurality of neutral sensitivity color patches, respectively; and said production cartridge neutral variation signature color data and said production cartridge neutral sensitivity signature color data are obtained based on performing printing and colorimetry measuring of a second plurality of neutral variation color patches and a second plurality of neutral sensitivity color patches, respectively.

* * * * *